(12) United States Patent
Boezeman et al.

(10) Patent No.: US 9,171,076 B2
(45) Date of Patent: Oct. 27, 2015

(54) HELP INFORMATION FOR LINKS IN A MASHUP PAGE

(75) Inventors: John J. Boezeman, Apex, NC (US); Kimberly D. Kenna, Cary, NC (US); Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1507 days.

(21) Appl. No.: 12/467,555

(22) Filed: May 18, 2009

(65) Prior Publication Data

US 2010/0293461 A1 Nov. 18, 2010

(51) Int. Cl.
G06F 3/0481 (2013.01)
G06F 17/30 (2006.01)

(52) U.S. Cl.
CPC .............................. G06F 17/30861 (2013.01)

(58) Field of Classification Search
USPC ........................................................ 715/708
See application file for complete search history.

(56) References Cited

U.S. PATENT DOCUMENTS

| | | | |
|---|---|---|---|
| 6,269,368 B1 | 7/2001 | Diamond | |
| 6,654,803 B1* | 11/2003 | Rochford et al. | 709/224 |
| 7,299,415 B2* | 11/2007 | Opheim et al. | 715/705 |
| 2004/0153456 A1* | 8/2004 | Charnock et al. | 707/10 |
| 2004/0255057 A1* | 12/2004 | Opheim et al. | 710/15 |
| 2005/0154986 A1 | 7/2005 | Bartek et al. | |
| 2006/0117315 A1* | 6/2006 | Bussert et al. | 717/174 |
| 2007/0226639 A1* | 9/2007 | Ruul | 715/765 |
| 2008/0091656 A1* | 4/2008 | Charnock et al. | 707/3 |
| 2008/0119953 A1 | 5/2008 | Reed et al. | |
| 2008/0140702 A1* | 6/2008 | Reed et al. | 707/102 |
| 2008/0141180 A1* | 6/2008 | Reed et al. | 715/854 |
| 2008/0208690 A1* | 8/2008 | Lim | 705/14 |
| 2008/0246889 A1* | 10/2008 | Moon | 348/734 |
| 2008/0288494 A1* | 11/2008 | Brogger et al. | 707/7 |
| 2009/0183237 A1* | 7/2009 | Cortes et al. | 726/4 |
| 2009/0199097 A1* | 8/2009 | Black et al. | 715/708 |
| 2009/0210353 A1* | 8/2009 | Mitchell et al. | 705/36 R |
| 2009/0265760 A1* | 10/2009 | Zhu et al. | 726/3 |
| 2009/0276835 A1* | 11/2009 | Jackson et al. | 726/4 |
| 2009/0313601 A1* | 12/2009 | Baird et al. | 717/106 |
| 2010/0037157 A1* | 2/2010 | Chang et al. | 715/764 |
| 2010/0064277 A1* | 3/2010 | Baird et al. | 717/120 |
| 2010/0077325 A1* | 3/2010 | Barnea et al. | 715/763 |
| 2010/0114685 A1* | 5/2010 | Blass | 705/14.16 |
| 2010/0138319 A1* | 6/2010 | Bezos et al. | 705/27 |
| 2010/0235224 A1* | 9/2010 | Fujioka | 705/10 |
| 2010/0235766 A1* | 9/2010 | Fujioka | 715/762 |
| 2010/0267446 A1* | 10/2010 | Pacey | 463/25 |
| 2010/0305999 A1* | 12/2010 | Fujioka | 705/7 |
| 2011/0022955 A1* | 1/2011 | Gilfix | 715/702 |

FOREIGN PATENT DOCUMENTS

KR 1020060128565 A 12/2006

OTHER PUBLICATIONS

Mark Pruett, "Yahoo! Pipes", a tool to create mashups, published on May 18, 2007.*

(Continued)

*Primary Examiner* — Reza Nabi
(74) *Attorney, Agent, or Firm* — Law Office of Jim Boice

(57) ABSTRACT

A mashup page presents link help information for logical links that pass context between widgets on the mashup page.

17 Claims, 4 Drawing Sheets

(56) References Cited

OTHER PUBLICATIONS

Volker Hoyer et al., "Market overview of enterprise mashup tools", In International Conference on Service oriented Computing, vol. 5364 of Lecture Notes in Computer Science, Springer-Verlag, 2008, pp. 708-721.*

Eric Griffn, "Microsoft Visual Web Developer 2008 Express edition step by step", published on Nov. 19, 2008.*

Visual Paradigm for UML 6.0, a tool to develop software application, Released on Dec. 4, 2006.*

Windows XP service pack 3, published on Apr. 21, 2008, 2 pages.*

Mitchell, Weather forcast system and method, U.S. Appl. No. 61/018,623, filed Jan. 2, 2008.*

International Searching Authority, International Search Report and Written Opinion for International Application No. PCT/EP2010/056651, Mailed Sep. 2, 2010, pp. 1-8.

Yu et al., "Innovation in the Programmable Web: Characterizing the Mashup Ecosystem", Dec. 1, 2008, Service-Oriented Computing a ICSOC 2008 Workshops, Springer Berlin Heidelberg, Berlin, Heidelberg, pp. 136-147.

Hoyer et al., "Market Overview of Enterprise Mashup Tools", Dec. 1, 2008, Service-Oriented Computing a ICSOC 2008 Workshops, Springer Berlin Heidelberg, Berlin, Heidelberg, pp. 708-721.

Ennals et al., "User-Friendly Functional Programming for Web Mishaps" ICFP'07, Oct. 1-3, 2007, Frieburg, Germany, pp. 223-233.

Nakano et al., "Method of Creating Web Services From Web Applications" IEEE International Conference on Service-Oriented Computing and Applications (SOCA'07), pp. 1-7.

Tatemura et al., "Mashup Feeds: Continuous Queries Over Web Services" SIGMOD'07, Jun. 12-14, 2007, Beijing, China, pp. 1128-1130.

* cited by examiner

HELP INFORMATION FOR LINKS IN A MASHUP PAGE

BACKGROUND

The present disclosure relates to the field of computers, and specifically to webpages generated on computers. Still more particularly, the present disclosure relates to webpages that are generated as mashups.

A mashup page ("mashup") is a webpage that incorporates content from different resources into a single webpage. The term "mashup" has its etymological basis in popular music, in which music from one genre (e.g., hip-hop) uses music from another genre (e.g., classic rock) as a background/backdrop to a lead rap vocal. In an analogous manner, a mashup webpage takes content from different sources and displays that content on a single page.

With the advent of Web 2.0, businesses are becoming more reliant on the use of mashup technologies as a way to resolve unique business needs more quickly and dynamically or to perform their daily tasks and activities. Mashups create situational applications by allowing an end user to place different components together onto a single page. A standardized design that allows for loose coupling of components allows these different pieces to work together as a single application, even though they were not explicitly designed to work with one another.

BRIEF SUMMARY

A mashup page presents link help information for logical links that pass context between widgets on the mashup page.

DETAILED DESCRIPTION

Figure 1:
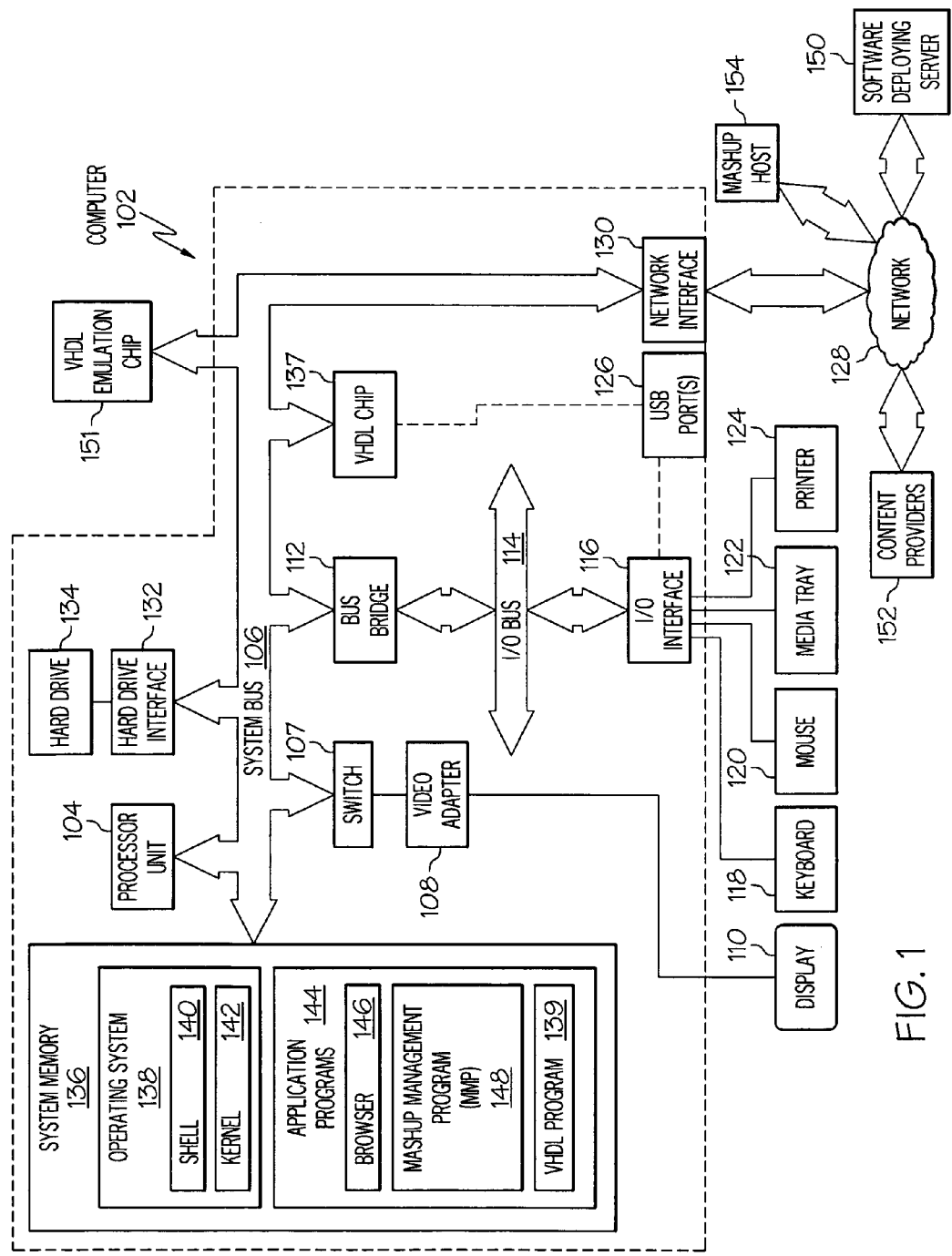
FIG. 1 depicts an exemplary computer in which the present invention may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java (JAVA is a registered trademark of Sun Microsystems, Inc. in the United States and other countries), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, content providers 152, and/or mashup host 154. Note computer 102 and/or mashup host 154 may be utilized as mashup site 204 shown below in FIG. 2, and that the architecture shown for computer 102 may be utilized by content providers 152 shown in FIG. 1 and by content providers 202a-n shown in FIG. 2.

Computer 102 includes a processor unit 104 that is coupled to a system bus 106. Processor unit 104 may utilize one or more processors, each of which has one or more processor cores. A video adapter 108 drives/supports a display 110, which is an output display that is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., mashup management program—MMP 148 described below) that support the processes described herein.

System bus 106 is coupled via a bus bridge 112 to an input/output (I/O) bus 114. An I/O interface 116 is coupled to IFO bus 114. IFO interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below) external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 and content providers 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a mashup management program (MMP) 148. MMP 148 includes code for implementing the processes described below, including those described in FIGS. 2-4. In one embodiment, computer 102 is able to download MMP 148 from software deploying server 150, including in an on-demand basis. Note further that, in one embodiment of the present invention, software deploying server 150 performs all of the functions associated with the present invention (including execution of MMP 148), thus freeing computer 102 from having to use its own internal computing resources to execute MMP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from MMP 148 causes VHDL program 139 to configure VHDL chip 137, which may be an FPGA, ASIC, etc.

In another embodiment of the present invention, execution of instructions from MMP 148 results in a utilization of VHDL program 139 to program a VHDL emulation chip 151. VHDL emulation chip 151 may incorporate a similar architecture as described above for VHDL chip 137. Once MMP 148 and VHDL program 139 program VHDL emulation chip 151, VHDL emulation chip 151 performs, as hardware, some or all functions described by one or more executions of some or all of the instructions found in MMP 148. That is, the VHDL emulation chip 151 is a hardware emulation of some or all of the software instructions found in MMP 148. In one embodiment, VHDL emulation chip 151 is a programmable read only memory (PROM) that, once burned in accordance with instructions from MMP 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
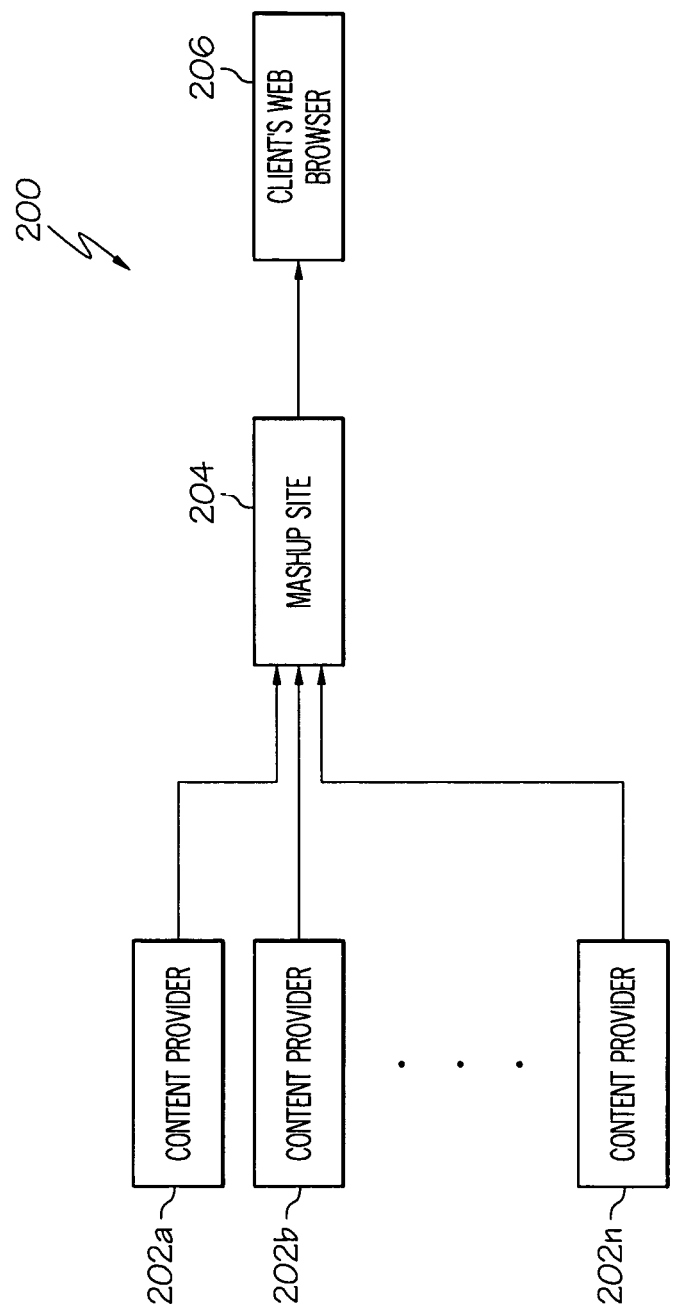
FIG. 2 illustrates an exemplary mashup system used in an embodiment of the present invention.

With reference now to FIG. 2, an exemplary mashup system 200, as contemplated for use by the present invention, is presented. The three main components of mashup system 200 are content providers 202a-n (where "n" is an integer, and content providers 202a-n are analogous to the content providers 152 shown in FIG. 1), mashup site 204 (which is analogous to computer 102 and/or mashup host 154 shown in FIG. 1), and client's web browser 206 (analogous to browser 146 shown in FIG. 1). Content providers 202a-n are the (sometimes unwitting) providers of the content being mashed. To facilitate data retrieval, providers often expose their content through Web protocols such as representational state transfer (REST), really simple syndication (RSS), and/or an XML-based Web content and metadata syndication format such as Atom. However, many data sources do not expose application program interfaces (APIs), including links that logically couple different widgets used in the mashup.

Mashup site 204 is where the mashup is hosted. It may be on the computer in which it is actually executed (e.g., computer 102 shown in FIG. 1), or it may be hosted on a remote server (e.g., mashup host 154 shown in FIG. 1). In one embodiment, mashups can be implemented similarly to traditional Web applications using server-side dynamic content generation technologies like servlets, common gateway interface (CGI), personal home page (PHP), or active server pages (ASP). Alternatively, mashed content can be generated directly within the client's browser through client-side scripting or applets. This client-side logic is often the combination of code directly embedded in the mashup's Web pages as well as scripting API libraries or applets (furnished by the content providers) referenced by these Web pages. Mashups using this approach can be termed rich internet applications (RIAs), meaning that they are very oriented towards the interactive user-experience. Rich internet applications are one hallmark of what's now being termed "Web 2.0". Client-side mashing requires less overhead on behalf of the mashup server (data can be retrieved directly from the content provider) and a more seamless user-experience (pages can request updates for portions of their content without having to refresh the entire page). Often mashups use a combination of both server and client-side logic to achieve their data aggregation. Many mashup applications use data that is supplied directly to them by their user base, making (at least) one of the data sets local. Note that the present invention enables the mashup site 204 to provide a user with an additional overlay of link helps, as described in detail herein.

The client's web browser 206 is where the mashup application is rendered graphically and where user interaction takes place. As described above, mashups often use client-side logic to assemble and compose the mashed content.

Figure 3:
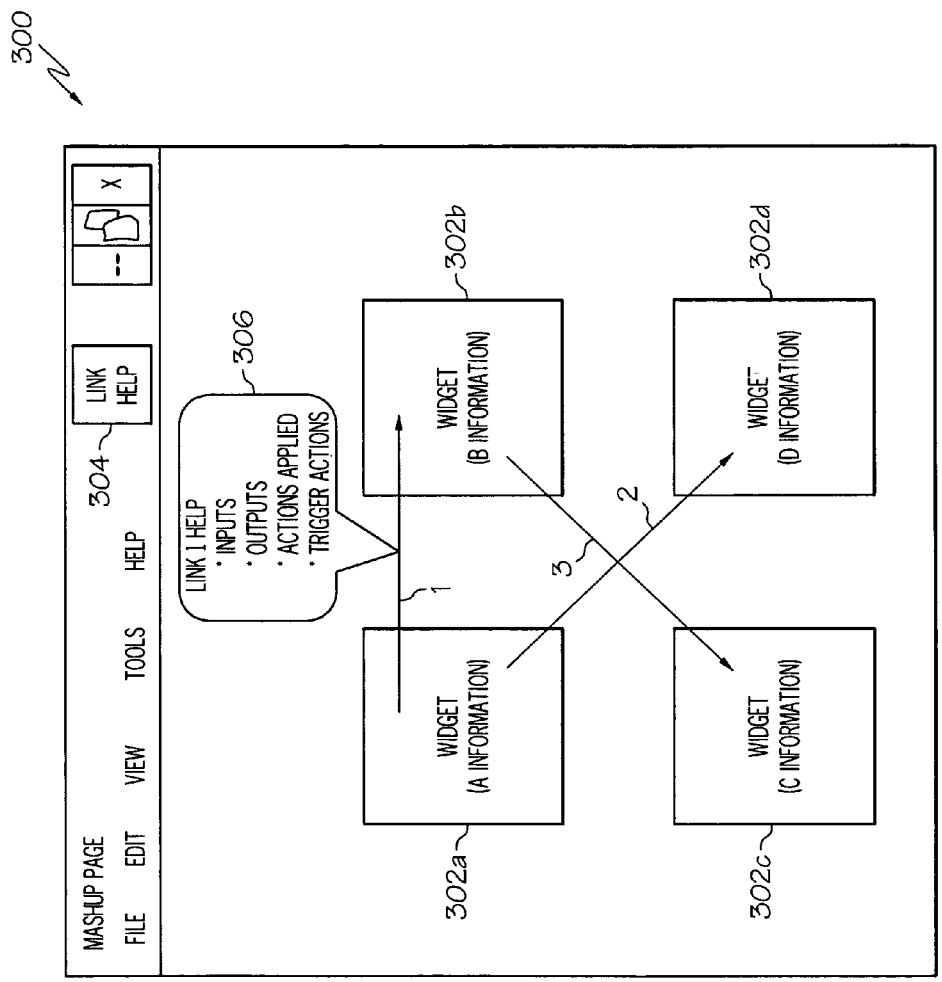
FIG. 3 depicts an exemplary graphical user interface (GUI) that depicts linked widgets in a mashup page.

With reference now to FIG. 3, consider an exemplary mashup page 300 as presented in accordance with the present invention. Displayed within mashup page 300 are multiple widgets 302a-d (where "d" is any integer, even though only four widgets are depicted in mashup page 300). Widgets 302a-d represent logic that presents information, from disparate resources, on the mashup page 300. For example, the "A information" presented by widget 302a may be a geographical map, the "B information" presented by widget 302b may be addresses for certain restaurants that are located at addresses represented by the geographical map, the "C information" from widget 302c may be menus for selected restaurants found in the "B information," etc. Each widget may be logically interconnected by the passage of context. These context passages can be viewed conceptually as links. That is, when context (i.e., active control) passes from one widget to another, this context passage is performed by a logical link, which in one embodiment is an application program interface (API), a calling routine, and/or other software/hardware logic that logically links the functionality/operations of a second widget to a first widget in response to some activity taking place within the first widget. For example, link 1 logically connects widget 302a with widget 302b when some specific action is taken at widget 302a (resulting in a change of context from widget 302a to widget 302b). An example of such a context-changing action may be clicking a marker (e.g., the letter "B" surrounded by a circle) that is displayed on the geographical map presented by widget 302a. Clicking this marker causes the display of the address of the restaurant located where the circled-letter B is shown on the geographic map. Another marker on the map could be a circled-letter "D", which is shown at a location of a hardware store depicted on the geographic map. Clicking the circled-letter "D" would result in link 2 pulling up the address of that hardware store out of "D information." As suggested by link 2, clicking the address of the restaurant may pull up "C information," such as the daily lunch menu being served at that restaurant.

The actions taken by the links and their associated context passage are specific and defined by the mashup's author. However, the end user (or a subsequent mashup programmer) may not understand what the links do or how they work. To address this issue, the present invention provides fine-grained help assistance. In one embodiment of the present invention, this help assistance covers the topics of "Inputs acceptable"; "Outputs produced"; "Actions applied to the different inputs received"; and "Actions that trigger the different outputs to be sent."

"Inputs acceptable" describes the type of data that a widget can accept. For example, continue to assume that widget 302b contains restaurant addresses for a particular chain of restaurants. The only type of input that is acceptable to widget 302b may be global positioning system (GPS) coordinates that are reflected by the map that widget 302a displays. If widget 302a were to attempt to send the name of the restaurant, this may or may not be acceptable to widget 302b.

"Outputs produced" describe what information is produced by a particular widget in response to an acceptable input. Continuing with the restaurant example, this output may be a street address, phone number, link to the restaurant's webpage, etc.

"Actions applied to the different inputs received" is a high-level description of how a widget handles an acceptable input. For example, widget 302b may access a database located at a particular server identified by a certain uniform resource locator (URL). The action may pull up information about the particular restaurant, cause the production of a bill to the restaurant owner for providing this information to the user, etc.

"Actions that trigger the different outputs to be sent" define what conditions must exist for an output to be sent. Examples of such actions include, but are not limited to, 1) what occurs in another "upstream" widget (e.g., what must occur in widget 302a for widget 302b to respond in accordance with link 1); 2) what internal conditions must exist within widget 302b for widget 302b to produce an output (e.g., has widget 302b updated its database within the past six months?); 3) what is the current state of context passage (e.g., is there a current, valid and authorized link 1 between widget 302a and widget 302b before widget 302b will produce an output"), etc.

Each element (inputs, outputs, actions applied, trigger actions) described above has its own help snippet. That is, rather than only providing global and generic help information for each widget, additional help snippets are provided that describe information about the links between widgets and how linked widgets respond/operate in response to the above-described links/context passers. In one embodiment, the new types (chunks) of help information are directly tied in with a registration mechanism for the inputs and outputs themselves. For example, if there is an XML representation used to register or classify an output message, it will also have: 1) an XML help property to describe the action that triggers the output, and 2) an XML help property that points to some text to describe the output data itself. Optimally, standard translation mechanisms should be leveraged. Thus, rather than the XML property containing the help text inline, it could be a reference to the properties file and key, or a resource bundle and key, etc.

Not all help content registered will be used when generating the help for a particular instance of a page. Only the help content registered that is applicable to how the different widgets on the page have been wired together (linked to promote context passages) will be leveraged. Thus, the help content for each widget is chunked up in a standard (link-centric) way so that the mashup maker service (e.g., mashup site 204 shown in FIG. 2) can then pull in the help text provided by the widget associated with the inputs, outputs, and actions that correspond with the current configuration that it knows about (e.g. how an instance of the widget is wired on a page).

There are multiple embodiments in which link/context passage help information is provided to a user. One method is to simply provide a help page that includes a lengthy and detailed description of how different widgets are linked, and how this linkage affects their operations. This method is useful for programmers, who may need extensive information about the operations of the widgets/links in order to modify the mashup page.

In one embodiment of the present invention, a help page that includes a lengthy and detailed description that dovetails the standard help information for the individual widgets on the page with the help information for how those different widgets are linked, and how this linkage affects their operations, is provided to the user. This embodiment provides end users of the page with a global understanding of how to use all the elements available to them on the current page. This embodiment also shields the user from awareness that these widgets were developed independently, and instead provides for a seamless end user experience.

An embodiment of the present invention provides help content for each individual widget on the page that includes a description that dovetails the standard help information for that widget with the help information for how that widget is linked to different widgets on the current page, and further describes how this linkage affects that widget's operations.

Another embodiment for providing help information about the widgets/links is to provide such information graphically and in less detail. For example, consider mashup page 300 again. Initially, mashup page 300 may be presented to a user as simply the geographic map described above. However, by clicking a link help button 304, the underlying logic of how the different widgets 302a-n are linked together is displayed. By hovering over a particular link (e.g., link 1), a pop-up help window 306 may appear. Within the help-window 306 are sub-topics that, when clicked, present detailed information about the widget at the terminal end of the depicted link (e.g., information for widget 302b is associated with link 1).

Figure 4:
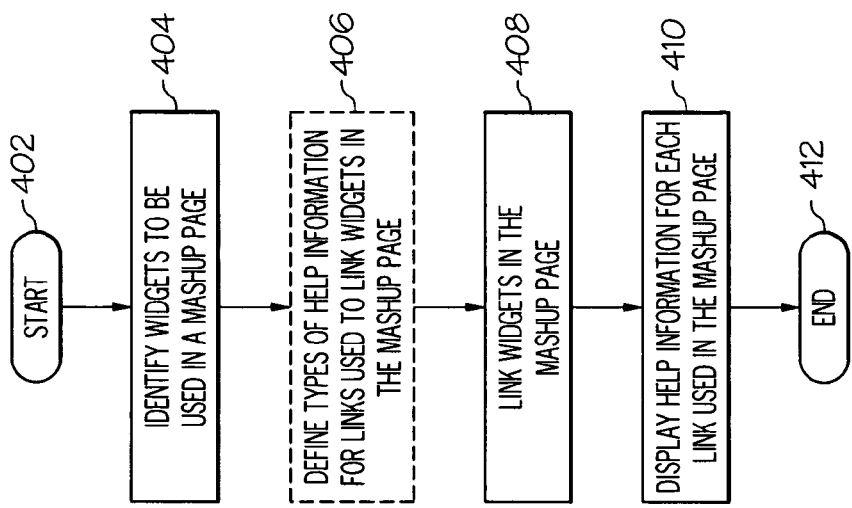
FIG. 4 is a high-level flow-chart that includes exemplary steps processed by a computer to manage help information for links used to link widgets in a mashup page.

With reference now to FIG. 4, a high-level flow chart of exemplary steps taken to present help data for links in a mashup page is presented. Note that in one embodiment, one or more of these steps are performed by a specific processor or computer. After initiator block 402, widgets to be used in a mashup page are identified by a mashup architect (block 404). Each widget is logic that is capable of displaying disparate types of information from different remote sources (e.g., content providers 202a-n that provide information that is in different formats, such as graphical information, database information, etc.) on a mashup page. Note that the operations of one or more of the widgets are dependent on their linkage to another widget used by the same mashup page. The mashup architect then defines what type of help information is to be displayed for the links that pass context between the widgets (block 406). Note that block 406 is presented in dashed lines, since this step is optional. That is, in one embodiment, the type of help information that is to be displayed is set to a default setting, such that all mashup pages show the same type of help information (e.g., the four categories described above) for each link/context passage.

Suitable programmed hardware logic (e.g., processor 104 using MMP 148 or VHDL emulation chip 151 shown in FIG. 1) then logically links widgets in the mashup page. This logical linkage makes the different widgets dependent upon one another, and also directly affects how the widgets operate. Thus, in the example presented above, widget 302a is dependent upon widget 302b to provide needed information about the restaurants depicted by the map that widget 302a generates, and the operation of providing addresses for these restaurants by widget 302b is dependent on the logic (widget definition) and user-operations (e.g., clicking) associated with widget 302a.

As described above, help information for each link used in the mashup page is then presented to the user on the mashup page (block 410). As described above, in one embodiment this help information (for each link) comprises help information about "Inputs acceptable"; "Outputs produced"; "Actions applied to the different inputs received"; and "Actions that trigger the different outputs to be sent" described above.

One embodiment of the present invention, as described above, thus creates help for the user of a page instance with widgets that have been wired together. In one embodiment, when administrators are wiring the widgets together, the help content additionally is still displayed for all the widgets ins (acceptable inputs) and outs (produced output), regardless of whether they are being used. This verbose text is helpful to administrators, because of the type of task they are performing. End users of the resulting page, however, benefit more from the simplified graphically-supported help information described above.

Thus, one or more embodiments of the present invention provide the ability to dynamically combine information about how the different components on a page have been wired together as well as help data provided by the components themselves. Each of the component register help snippets are associated with the behavior of each of the ins and outs that it publishes for loosely coupling itself to other components. The help for an individual widget on the page that has had the help action invoked on it can dynamically generate the help context that describes how that view is interacting with the other views on the page, (i.e., what views it is passing context to and any manipulation that may be involved with the context).

As described herein, one embodiment of the present invention provides help information for links that pass context from one widget to another. This embodiment departs from established processes in a new and uniquely challenging way, since help information for information on a webpage in the prior art was conventionally directed to autonomous components. That is, help information was typically presented for each component that currently holds context on a webpage, with no regard as to how that component is context-linked to another component. For example, help information that was provided for a map was ignorant of, and was agnostic to, how that map interacted with any other component/widget on the webpage. Thus, prior to the discovery of the present invention, there was no motivation to try to associate help information from various widgets, since such help information was static and unrelated to context-linked other widgets. The presently described process, however, provides link help information, rather than just component/widget help information. This link help information results in dynamically adjusted help information that can be applied to widgets according their context-linkage to other widgets. This link help information has resulted in the new and unexpected benefit of allowing an end-user to more fully understand the dynamics between various widgets located on a mashup webpage, rather than following the traditional notion of help information that is static for individual widgets.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of providing help information for a specific link on a mashup page, the computer-implemented method comprising:
defining types of link help information for a specific link used to link widgets in a mashup page, wherein the widgets utilize disparate types of data sources from different remote content providers;
linking, by a suitably programmed hardware logic, a first widget to a second widget on the mashup page, wherein the first widget and the second widget are linked by the specific link, wherein the specific link passes context from the first widget to the second widget, and wherein operations of the second widget are dependent on functions of and activities executed in the first widget; and
displaying, by an output display, a link help information topic and link help information for the specific link.

2. The computer-implemented method of claim 1, wherein the link help information provides information regarding what type of data is acceptable to the second widget.

3. The computer-implemented method of claim 1, wherein the link help information provides information regarding what information is produced by the second widget in response to an acceptable type of data being input from the first widget.

4. The computer-implemented method of claim 1; wherein the link help information provides a high-level description of operations performed by the second widget on an acceptable input from the first widget, and wherein the operations comprise accessing a remote database for inputs to the second widget.

5. The computer-implemented method of claim 1, wherein the link help information provides information regarding a condition that must exist as a prerequisite for an output to be sent from the second widget, wherein the condition that must exist is that a database used by the second widget has been updated within a predetermined past period of time, and wherein the second widget is currently enabled.

6. The computer-implemented method of claim 5, wherein the condition that must exist is the execution of one or more operations in the first widget.

7. The computer-implemented method of claim 5, wherein the condition that must exist is the execution of one or more operations in the second widget.

8. The computer-implemented method of claim 5, wherein the condition that must exist is a current and updated link between the first widget and the second widget.

9. A computer program product for providing help information for a specific link on a mashup page, the computer program product comprising:

a computer usable medium having computer usable program code embodied therewith, the computer usable program code comprising:

computer usable program code configured to define types of link help information for a specific link used to link widgets in a mashup page, wherein the widgets utilize disparate types of data sources from different remote content providers;

computer usable program code configured to link, by a suitably programmed hardware logic, a first widget to a second widget on the mashup page, wherein the first widget and the second widget are linked by the specific link, wherein the specific link passes context from the first widget to the second widget, and wherein operations of the second widget are dependent on functions of and activities executed in the first widget; and computer usable program code configured to display, by the suitably programmed hardware logic, a link help information topic and link help information for the specific link on the mashup page.

10. The computer program product of claim 9, wherein the link help information provides information regarding what type of data can be accepted by the second widget.

11. The computer program product of claim 9, wherein the link help information provides information regarding what information is produced by the second widget in response to an acceptable input from the first widget.

12. The computer program product of claim 9, wherein the link help information provides a high-level description of operations performed by the second widget on an acceptable input from the first widget.

13. The computer program product of claim 9, wherein the link help information provides information regarding what condition must exist for an output to be sent from the second widget.

14. The computer program product of claim 13, wherein the condition that must exist is the execution of one or more operations in the first widget.

15. The computer program product of claim 13, wherein the condition that must exist is the execution of one or more operations in the second widget.

16. The computer program product of claim 13, wherein the condition that must exist is a current and updated link between the first widget and the second widget.

17. The computer program product of claim 9, wherein the computer program is downloaded to a client computer from a software deploying server in an on-demand basis.

\* \* \* \* \*